(12) United States Patent
Kim et al.

(10) Patent No.: US 11,922,090 B2
(45) Date of Patent: Mar. 5, 2024

(54) APPARATUS AND METHOD FOR CONTROLLING AUTOMATIC COLOR CALIBRATION OF A VIDEO WALL

(71) Applicant: HYUNDAI IT CO., LTD., Seoul (KR)

(72) Inventors: Yong Tae Kim, Suwon-si (KR); Yong Seog Kim, Icheon-si (KR); Ji Hoon Shim, Seoul (KR)

(73) Assignee: HYUNDAI IT CO., LTD., Seoul (KR)

( * ) Notice: Subject to any disclaimer, the term of this patent is extended or adjusted under 35 U.S.C. 154(b) by 0 days.

(21) Appl. No.: 17/381,568

(22) Filed: Jul. 21, 2021

(65) Prior Publication Data
US 2022/0027113 A1 Jan. 27, 2022

(30) Foreign Application Priority Data

Jul. 21, 2020 (KR) .......................... 10-2020-0090438

(51) Int. Cl.
| | |
|---|---|
| G09G 3/34 | (2006.01) |
| G06F 3/14 | (2006.01) |
| G09G 3/32 | (2016.01) |
| G09G 3/36 | (2006.01) |
| G09G 5/12 | (2006.01) |
| H04N 9/12 | (2006.01) |

(52) U.S. Cl.
CPC .............. *G06F 3/1446* (2013.01); *G09G 3/32* (2013.01); *G09G 2300/026* (2013.01); *G09G 2320/0233* (2013.01); *G09G 2320/0666* (2013.01); *G09G 2320/0693* (2013.01)

(58) Field of Classification Search
CPC .. G06G 3/1446; G09G 3/32; G09G 2300/026; G09G 2320/0233; G09G 2320/0666–0693
See application file for complete search history.

(56) References Cited

U.S. PATENT DOCUMENTS

| | | | |
|---|---|---|---|
| 2006/0114218 A1* | 6/2006 | Ho ........................ | G09G 3/3406 345/102 |
| 2009/0184904 A1* | 7/2009 | S ........................... | G09G 3/3413 345/82 |
| 2016/0062725 A1* | 3/2016 | Odagiri ................. | G06F 3/1446 345/1.3 |
| 2016/0165229 A1* | 6/2016 | Kao ........................ | H04N 9/12 348/189 |
| 2016/0267850 A1* | 9/2016 | Tada ..................... | G09G 3/3607 |
| 2019/0014294 A1* | 1/2019 | Chae .................... | H04N 9/3182 |
| 2020/0225903 A1* | 7/2020 | Cohen ....................... | G09G 5/12 |

FOREIGN PATENT DOCUMENTS

KR 10-1723456 B1 4/2017

\* cited by examiner

*Primary Examiner* — Lin Li
(74) *Attorney, Agent, or Firm* — Hauptman Ham, LLP

(57) ABSTRACT

The present invention relates to an apparatus and method for controlling automatic color calibration of a video wall by smoothly displaying an entire video on the video wall and improving user visibility. The automatic color calibration apparatus comprises a control unit configured to output the number of the plurality of video boards constituting the video wall to the display unit and store the number in a storage unit according to operation signals from the user input unit, and perform automatic color calibration for the plurality of video boards.

3 Claims, 3 Drawing Sheets

APPARATUS AND METHOD FOR CONTROLLING AUTOMATIC COLOR CALIBRATION OF A VIDEO WALL

CROSS REFERENCE TO RELATED APPLICATION

This application claims the benefit of Korean Patent Application No. 10-2020-0090438 filed with the Korean Intellectual Property Office on Jul. 21, 2020, the disclosure of which are incorporated herein by reference.

TECHNICAL FIELD

The present invention relates to an apparatus and method for controlling automatic color calibration of a video wall, and more particularly, to an apparatus and method for controlling automatic color calibration of a video wall by smoothly displaying an entire video on the video wall and improving user visibility.

BACKGROUND

So far, various types of video board such as liquid crystal display device, plasma display device, and an organic light emitting diode display device have been developed. The video board includes a display panel for displaying videos and a driver circuit for driving the display panel.

The screen size of the video board has continuously increased due to the technological advances. However, there was a limitation in realizing a super-large screen such as electronic blackboard and electronic billboard. Therefore, a new idea was developed to make a video wall consisting of a group of video boards and adjust the overall screen size and shape of the video wall by interconnecting a plurality of video boards.

However, when a video wall is configured by interconnecting a multiple number of video boards, the brightness and/or contrast ratio among each video board are not constant, and thus the entire video screen of the video wall does not perform smoothly and causes a problem of poor visibility.

An exemplary prior art is disclosed in Korean Patent No. 10-1723456 (registered on Mar. 30, 2017).

SUMMARY

The purpose of the present invention is to provide an apparatus and method for controlling automatic color calibration of a video wall capable of smoothly displaying an entire video screen and improving user visibility.

In order to achieve the afore-mentioned purpose, according to some embodiments of the present invention, there is provided an automatic color calibration apparatus of a video wall comprising a signal line connection unit configured to transmit and receive data signals to and from a PC and a video wall including a plurality of video boards interconnected in a closed-loop daisy chain, a display unit, a user input unit including a plurality of user setting buttons, and a control unit configured to output the number of the plurality of video boards constituting the video wall to the display unit and store the number in a storage unit according to operation signals from the user input unit, and perform automatic color calibration for the plurality of video boards, wherein the control unit comprises:

a dimming control unit configured to sequentially receive the illuminance sensor values from the plurality of video boards through the signal line connection unit to store them in the storage unit, determine SET ID of the video board having the lowest illuminance sensor value and the illuminance sensor value with the lowest brightness, compare the determined illuminance sensor value of the lowest brightness with the illuminance sensor values of other video board, and output SET ID and corresponding data to control the backlight brightness to each of the plurality of video boards through the signal line connection unit so that the backlight brightness of the other video boards match that of the video board with the lowest brightness; and a contrast ratio control unit configured to sequentially receive 100% WHITE brightness values from the plurality of video boards to store them in the storage unit, determine the SET ID of the video board device having the lowest brightness value and the lowest brightness value itself, calculate the differences between the determined lowest brightness value and the brightness values of other video boards, and outputs the SET ID and data to control the contrast value to the plurality of video boards so that all of the plurality of video boards have a uniform contrast value.

The control unit performs an automatic color calibration for the plurality of video boards upon receiving an automatic color calibration command from the PC through the signal line connection unit.

Otherwise, the control unit performs an automatic color calibration for the plurality of video boards upon receiving a "START" command for automatic color calibration from the PC through the signal line connection unit.

According to some embodiments of the present invention, there is provide an automatic color calibration method of a video wall comprising:

storing the number of a plurality of video boards interconnected in a closed-loop daisy chain to constitute the video wall in a storage unit according to setting button signal;

in response to the input of the "START" command for automatic color calibration for the plurality of video boards, sequentially receiving the illuminance sensor values from each of the plurality of video boards to store them in the storage unit, and determining SET ID of the video board having the lowest illuminance sensor value and the illuminance sensor value of the lowest brightness;

comparing the determined illuminance sensor value of the lowest brightness with the illuminance sensor values of other video boards and outputting SET ID of video board and corresponding data to control the backlight brightness to each of the plurality of video boards so that the backlight brightness of each video board matches that of the video board with the lowest brightness;

sequentially receiving the 100% WHITE brightness values from the plurality of video boards to store them in the storage unit, and determining the SET ID of the video board device having the lowest brightness value and the brightness value of the lowest brightness;

calculating the differences between the determined lowest brightness value and the brightness values of other video boards, and outputting the SET ID and the corresponding data to control the contrast value to the plurality of video boards so that all of the plurality of video boards have a uniform contrast value.

The automatic color calibration control device according to the present invention can smoothly display an entire video screen of the video wall and improve user visibility by uniformly adjusting the brightness and/or contrast among a plurality of video boards interconnected in a closed-loop daisy chain during the manufacturing process of the video wall.

DETAILED DESCRIPTION

The specific structural or functional description of some embodiments according to the concept of the present invention disclosed in this specification is disclosed only for the purpose of explaining the embodiments of the present invention, and other embodiments according to the concept of the present invention may be implemented in various forms and the concept of the present invention is not limited to such embodiments.

Hereinafter, exemplary embodiments of the present invention will be described in detail with reference to the accompanied drawings.

Figure 1:
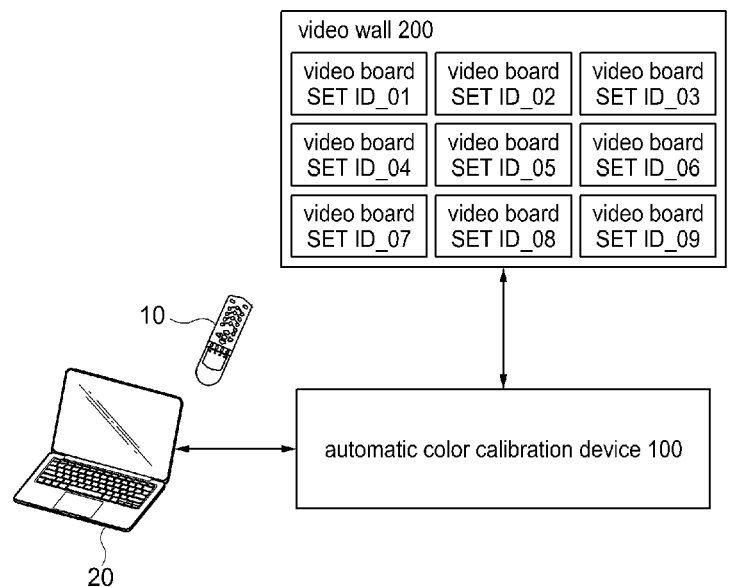
FIGS. 1 to 3 are exemplary views for explaining a video wall and its automatic color calibration control device according to some embodiments of the present invention.
Figure 2:
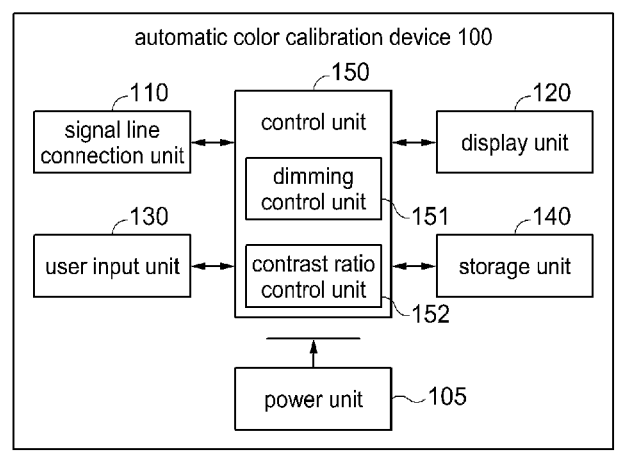
Figure 3:
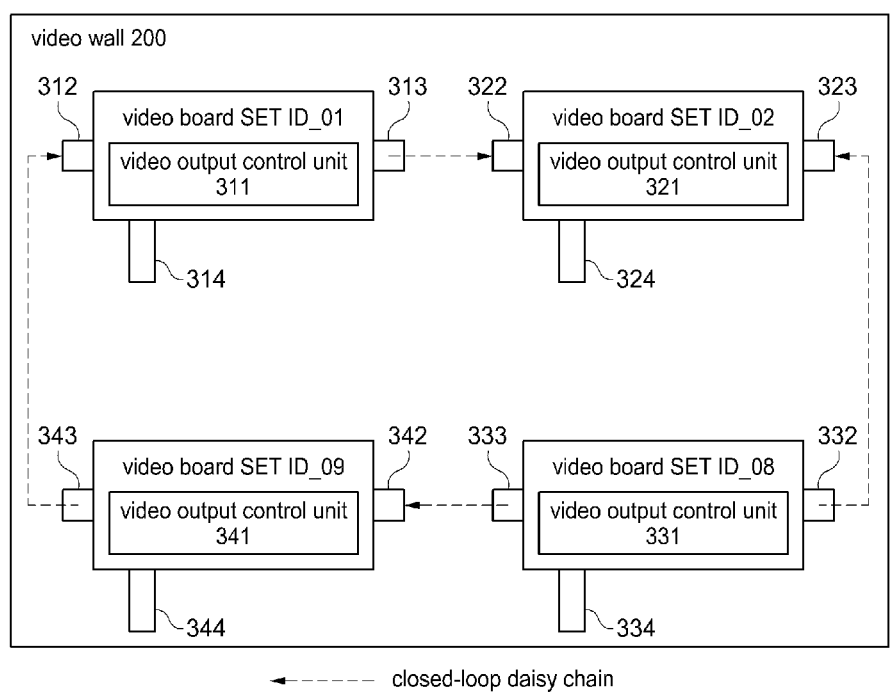

FIGS. 1 to 3 are exemplary views for explaining a video wall and its automatic color calibration control device according to the present invention.

First, referring to FIG. 1, a video wall 200 is a device that displays a video by using a plurality of video boards for showing advertisement, entertainment, sports, and broadcasting. For example, in the video wall 200 installed in an event hall, each of the plurality of video boards may individually display respective video source, or each of the plurality of video boards may display separately allocated portion of a single video so that the video wall 200 may enlarge and display the overall video from a single video source.

Each of the plurality of video boards included in the video wall 200 stores a 100% white brightness value, a 20% white brightness value, and an adjusted contrast value in the storage unit as "Factory Mode Color" during the manufacturing process.

The plurality of video boards included in the video wall 200 may be interconnected in a closed-loop daisy chain. Each video board contained in the video wall 200 identifies the allocated portion of the video from the video data transmitted through the closed-loop daisy chain and displays it on the corresponding monitor. Each of the plurality of video boards interconnected in a closed-loop daisy chain stores set identification (SET ID) information in the storage unit.

Referring to FIG. 3, each video board of the video wall 200 includes a video output control unit 311, 321, 331, 341, a data input unit 312, 322, 332, 342, a data output unit 313, 323, 333, 343, and an HDMI port 314, 324, 334, 344.

The video output control unit 311, 321, 331, 341 analyzes the video data received through the HDMI port 314, 324, 334, 344, and produces a playback video to be displayed on the corresponding monitor based on the analyzed video data. The video output control unit 311, 321, 331, 341 identifies the playback portion to be displayed on the corresponding monitor among the video data received from the data input unit 312, 322, 332, 342 and displays its playback portion on the corresponding monitor. It also transmits the received video data to the adjacent video board through the data output unit 313, 323, 333, 343.

The video output control unit 311, 321, 331, 341 is largely composed of a liquid crystal display module and a system module. The liquid crystal display module may comprise a liquid crystal display panel, a data driving circuit, a gate driving circuit, a timing controller, a multiplexer, a control unit, a backlight driving circuit, a backlight unit, and an illuminance sensor. The system module may comprise a storage unit, a microcomputer, a power unit, a scaler, an infrared receiver, and an input/output unit including RS-232 and HDMI port.

The data output unit 313, 323, 333, 343 is configured to transmit a video data to an adjacent video board according to the determination of the video output control unit 311, 321, 331 and 341, and the data input unit 312, 322, 332, 342 is configured to receive a video data from an adjacent video board device by being connected to the data output units 313, 323, 333, 343.

Referring to FIG. 2, the automatic color calibration control device 100 includes a power supply unit 105, a signal line connection unit 110, a display unit 120, a user input unit 130, a storage unit 140, and a control unit 150.

The power supply unit 105 may comprise a switch-controlled power supply unit and an adapter for converting external AC power into DC power.

The signal line connection unit 110 transmits and receives data signals to and from a PC and a video wall, respectively.

The display unit 120 may be implemented by a plurality of 7-segments using LEDs. The user input unit 130 may be implemented to include a plurality of setting buttons. The plurality of setting buttons may include a setting start button, an increase (+) button, a decrease (−) button, and a mode change button.

The setting start button is a button for inputting a start signal to set the number and temperature of the video boards and executing automatic color calibration.

The increase (+) button and decrease (−) button are buttons for inputting a signal to increase (+) or decrease (−) the number and temperature of the video boards.

The mode change button is used for changing the operation mode among an automatic color calibration execution mode, a video board number or quantity setting mode, a current temperature display mode, an inverter current measurement mode, and an external illuminance sensor measurement mode.

The storage unit 140 includes ROM and RAM and stores executable programs and data. The control unit 150 has a function of setting the number of video boards and executing the automatic color calibration of the video wall according to the instruction signal from the user input unit 130.

When the state of the 7-segment of the display unit 120 is "Auto", the control unit 150 displays "0001" on the 7-segment of the display unit 120 in response to a signal from the mode change button, and displays corresponding number in response to the signal from the increase (+) button or a decrease (−) button. The control unit 150 identifies the final number as the number of video boards and stores it in the storage unit 140.

When the state of the 7-segment of the display unit 120 is "Find", the control unit 150 displays "Auto" in response to the signal from the mode change button, and then blink "Auto" and perform automatic color calibration of the video boards in response to the signal from the setting start button.

When an automatic color calibration command, for example, "did:01-acpe" is received from a PC 20 such as a notebook through the signal line connection unit 110, the control unit 150 performs the automatic color calibration of the video boards.

The user may select "Setup" and "Auto Calibration Start" from an "OSD menu" after the "OSD menu" is displayed on the video wall 100 by using the remote control 10. When the automatic color calibration "START" command is received from the video wall 100 through the signal line connection unit 110, the control unit 150 may perform automatic color calibration for the plurality of video boards constituting the video wall 100.

Referring to FIG. 2, the control unit 150 may comprise a dimming control unit 151 and a contrast ratio control unit 152 to perform automatic color calibration for the video boards.

The dimming control unit 151 sequentially receives the illuminance sensor values from each of the plurality of video boards through the signal line connection unit 110 and stores them in the storage unit 140. The dimming control unit 151 determines the SET ID of the video board having the lowest illuminance sensor value and the illuminance sensor value of the lowest brightness, and then compares the illuminance sensor values of other video boards with the determined illuminance sensor value of the lowest brightness.

The dimming control unit 151 transmits the video board SET ID and data to control the backlight brightness to the corresponding video boards through the signal line connection unit 110 so that the backlight brightness of each video board matches that of the video board with the lowest brightness.

The contrast ratio control unit 152 sequentially receives the 100% WHITE brightness values from each of the plurality of video boards through the signal line connection unit 110 and stores them in the storage unit 140. The contrast ratio control unit 152 determines the SET ID of the video board having the lowest brightness value and the brightness value of the lowest brightness, and then calculates the differences between the determined lowest brightness value and the brightness values of the other video boards.

Based on the calculated brightness value differences, the contrast ratio control unit 152 transmits the SET ID of the video board and data to control the contrast value to the other videos boards through the signal line connection unit 110 so that all of the plurality of video boards have a uniform contrast value.

Figure 4:
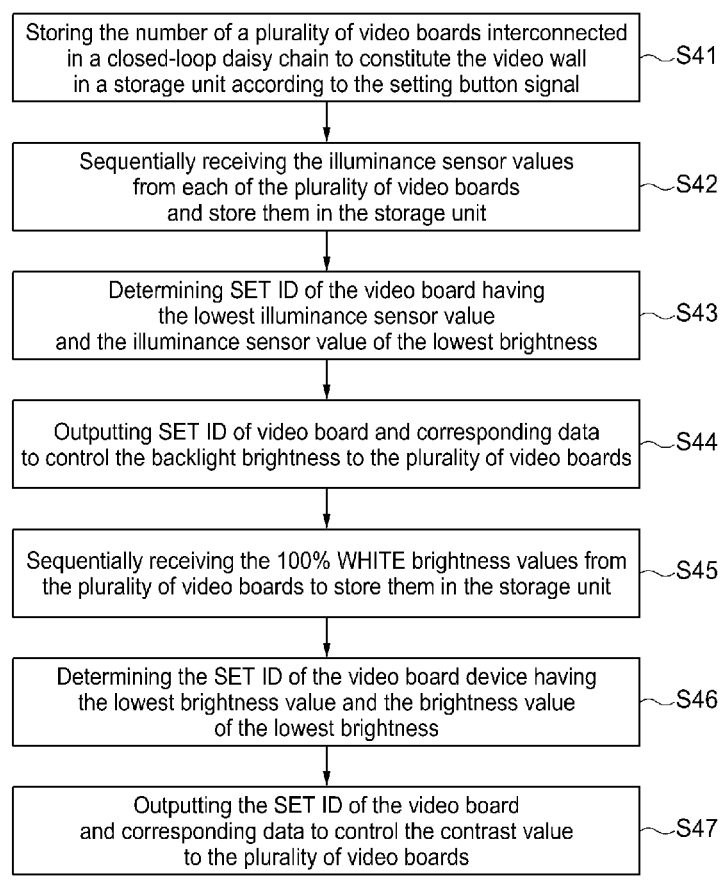
FIG. 4 is a flowchart of automatic color calibration control method according to some embodiments of the present invention.

FIG. 4 is a flowchart showing the automatic color calibration control process according to some embodiments of the present invention. The video wall includes a plurality of video boards interconnected in a closed-loop daisy chain. The automatic color calibration control device is connected to the video wall by an RS232 signal cable, for example.

First, the automatic color calibration control device stores the number of the plurality of video boards constituting the video wall in the storage unit according to the user's operation at S41.

When the automatic color calibration "START" command for the plurality of video boards is received, the automatic color calibration control device sequentially receives the illuminance sensor values from the plurality of video boards and stores them in the storage unit at S42.

The automatic color calibration control device determines the SET ID of the video board having the lowest illuminance sensor value and the illuminance sensor value of the lowest brightness at S43.

The automatic color calibration control device compares the determined illuminance sensor value of the lowest brightness with the illuminance sensor values of the other video boards, and outputs SET ID of video board and data to control the backlight brightness to each of the plurality of video boards so that the backlight brightness of the other video boards match that of the video board with the lowest brightness at S44.

The automatic color calibration control device sequentially receives the 100% WHITE brightness values from each of the plurality of video boards and stores them in the storage unit at S45.

The automatic color calibration control device determines the SET ID of the video board device having the lowest brightness value and the brightness value of the lowest brightness at S46.

The automatic color calibration control device calculates the differences between the determined lowest brightness value and the brightness values of other video boards, and outputs the SET ID and the data to control the contrast value to each of the plurality of video boards so that all of the plurality of video boards have a uniform contrast value at S47.

Although exemplary embodiments of the present disclosure have been shown and described with reference to the accompanied drawings, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An automatic color calibration apparatus of a video wall comprising:
   a signal line connection unit configured to transmit and receive data signals to and from a computer and a video wall including a plurality of video boards interconnected in a closed-loop daisy chain, wherein each video board of the plurality of video boards includes a display module and an illuminance sensor configured to sense an illuminance value of the display module;
   a display unit;
   a user input unit including a plurality of user setting buttons; and
   a control unit configured to output a number of the plurality of video boards constituting the video wall to the display unit and store the number in a storage unit according to operation signals from the user input unit, and perform automatic color calibration for the plurality of video boards,
   wherein the control unit comprises a processor configured to perform a backlight brightness control and a contrast value control such that the plurality of video boards have same backlight brightness values and same contrast values;
   wherein the backlight brightness control includes:
      sequentially receiving illuminance values from the plurality of video boards through the signal line connection unit,
      storing the received illuminance values in the storage unit,
      determining, among the plurality of video boards, a video board having the lowest illuminance value,
      comparing the determined lowest illuminance value with the received illuminance values, and
      outputting identification information on each video board and corresponding data to control backlight brightness to each video board of the plurality of video boards through the signal line connection unit so that the backlight brightness of the other video boards match the determined lowest illuminance value of the video board, and wherein the contrast value control includes:
sequentially receiving a plurality of WHITE brightness values from the plurality of video boards,
storing the received plurality of WHITE brightness values in the storage unit,
determining the identification information of the video board having the lowest WHITE brightness value among the received plurality of WHITE brightness values,
calculating the differences between the determined lowest WHITE brightness value of the determined video board and the received WHITE brightness values of the other video boards among the plurality of video boards, and
outputting the identification information on each video board and corresponding data to control the contrast value to each video board of the plurality of video boards so that all of the plurality of video boards have a uniform contrast value.

2. The automatic color calibration apparatus according to claim 1,
wherein the control unit performs a color calibration for the plurality of video boards upon receiving a "START" command from the computer through the signal line connection unit.

3. An automatic color calibration method of a video wall, the method performed by an automatic color calibration apparatus comprising a processor and signal line connection unit configured to be connected with the video wall having a plurality of video boards, wherein each video board of the plurality of video boards includes a display module and an illuminance sensor configured to sense an illuminance value of the display module, the method comprising:
storing a number of the plurality of video boards interconnected in a closed-loop daisy chain to constitute the video wall in a storage unit according to setting button signal; and
performing a backlight brightness control and a contrast value control such that the plurality of video boards have same backlight brightness values and same contrast values,
wherein performing the backlight brightness control includes:
sequentially receiving illuminance values from each of the plurality of video boards to store the received illuminance values in the storage unit, and determining, among the plurality of video boards, a video board having the lowest illuminance value; and
comparing the determined lowest illuminance value with the received illuminance values of the other video boards and outputting identification information on each video board and corresponding data to control backlight brightness to each video board of the plurality of video boards so that the backlight brightness of the other video boards match the determined lowest illuminance value of the video board; and
wherein performing the contrast value control includes:
sequentially receiving a plurality of WHITE brightness values from the plurality of video boards to store the received plurality of WHITE brightness value in the storage unit, and determining the identification information of the video board having the lowest WHITE brightness value among the received plurality of WHITE brightness values; and
calculating the differences between the determined lowest WHITE brightness value of the determined video board and the received WHITE brightness values of the other video boards among the plurality of video boards, and outputting the identification information on each video board and the corresponding data to control the contrast value to each video board of the plurality of video boards so that all of the plurality of video boards have a uniform contrast value.

* * * * *